US012633709B2

(12) United States Patent
Lu et al.

(10) Patent No.: US 12,633,709 B2
(45) Date of Patent: May 19, 2026

(54) RJ45 PLUG

(71) Applicant: Shenzhen Alex Connector Co Ltd, Shenzhen (CN)

(72) Inventors: Haiqiu Lu, Shenzhen (CN); Xiaoan Wang, Shenzhen (CN); Xiaobing Zhu, Shenzhen (CN); Qi Peng, Shenzhen (CN)

(73) Assignee: Shenzhen Alex Connector Co Ltd, Shenzhen (CN)

( * ) Notice: Subject to any disclaimer, the term of this patent is extended or adjusted under 35 U.S.C. 154(b) by 265 days.

(21) Appl. No.: 18/336,537

(22) Filed: Jun. 16, 2023

(65) Prior Publication Data

US 2024/0106176 A1 Mar. 28, 2024

(30) Foreign Application Priority Data

Sep. 22, 2022 (CN) ......................... 202222512405.6

(51) Int. Cl.
*H01R 24/64* (2011.01)
*H01R 13/639* (2006.01)
*H01R 24/20* (2011.01)

(52) U.S. Cl.
CPC ........... *H01R 24/64* (2013.01); *H01R 13/639* (2013.01); *H01R 24/20* (2013.01)

(58) Field of Classification Search
CPC .............................. H01R 24/64; H01R 13/627
See application file for complete search history.

(56) References Cited

U.S. PATENT DOCUMENTS 4,550,967 A * 11/1985 Riches ............... H01R 13/6278 439/345
5,090,916 A * 2/1992 Magnier ................ H01R 13/26 439/352
5,116,088 A * 5/1992 Bird .................. A61M 16/0006 128/912
5,478,252 A * 12/1995 Lecomte ............. H01R 13/633 439/154
5,486,117 A * 1/1996 Chang .................. H01R 12/727 439/353
5,579,425 A 11/1996 Lampert et al.
5,752,847 A * 5/1998 McCormick ......... H01R 13/635 439/310
7,083,459 B1 * 8/2006 Wu .................... H01R 13/6275 439/354
7,645,155 B2 * 1/2010 Burke ................ H01R 13/6272 439/344

(Continued)

*Primary Examiner* — Neil Abrams

(57) ABSTRACT

The present utility model provides an RJ45 plug, comprising a plug body and an insertion tongue structure arranged on the plug body, wherein the insertion tongue structure comprises a connection part and an elastic sheet part, the connection part is connected to the plug body, the elastic sheet part is connected to the connection part, and the elastic sheet part is provided with a V-shaped slope structure that is in lock-catch fit with an RJ45 socket. The present utility model has the following beneficial effects: with the improvement of the insertion tongue structure of the RJ45 plug, the RJ45 plug can be directly pulled out and unlocked without pressing after being inserted into an RJ45 socket, and the improved insertion tongue structure does not need to provide a part for pressing, so that a length of the insertion tongue structure can be shortened, and the risk of breakage is reduced.

6 Claims, 3 Drawing Sheets

(56) References Cited

U.S. PATENT DOCUMENTS

| | | | | | |
|---|---|---|---|---|---|
| 7,686,638 | B2 * | 3/2010 | Boyd | H01R 13/6272 | 439/352 |
| 8,079,880 | B2 * | 12/2011 | Lin | H01R 24/50 | 439/700 |
| 8,579,646 | B2 * | 11/2013 | Lee | H01R 13/6272 | 439/344 |
| 8,591,249 | B2 * | 11/2013 | Harnish | H01R 13/562 | 439/447 |
| 8,747,141 | B2 * | 6/2014 | Crain | H01R 13/6272 | 439/258 |
| 8,840,419 | B2 * | 9/2014 | Huang | H01R 13/6272 | 439/352 |
| 9,263,818 | B2 * | 2/2016 | Lam | H01R 43/20 | |
| 10,476,212 | B2 | 11/2019 | Bopp et al. | | |
| 10,756,497 | B2 | 8/2020 | Tanaka | | |
| 10,811,831 | B1 | 10/2020 | Wu et al. | | |
| 11,146,013 | B2 | 10/2021 | Lee | | |
| 11,296,460 | B2 | 4/2022 | Kurita | | |
| 2007/0270016 | A1 * | 11/2007 | Boyd | H01R 13/6272 | 439/354 |
| 2017/0207574 | A1 | 7/2017 | Hsieh | | |
| 2021/0336387 | A1 | 10/2021 | Little | | |

* cited by examiner

RJ45 PLUG

TECHNICAL FIELD

The present utility model relates to a connector, and in particular to an RJ45 plug.

BACKGROUND

For the insertion of the conventional RJ45 plug, as shown in FIG. 1, an RJ45 plug 20 is inserted into an RJ45 socket 10 and locked by a lock catch structure 101 of the RJ45 socket 10, and an insertion tongue structure 201 of the RJ45 plug 20 needs to be pressed to unlock the plug, so that the plug can be pulled out, as shown in FIG. 2. The unlocking operation is troublesome, for example, an installation space is narrow, which makes it difficult to unlock by pressing, and the provision of a pressing part is likely to cause breakage after repeated pressing due to a long length of the conventional insertion tongue structure 201.

Therefore, how to provide an insertion tongue structure of a novel RJ45 plug to avoid unlocking by pressing is a technical problem to be solved urgently by those skilled in the art.

SUMMARY

In order to solve the problems in the prior art, the present utility model provides an RJ45 plug.

The present utility model provides an RJ45 plug, comprising a plug body and an insertion tongue structure arranged on the plug body, wherein the insertion tongue structure comprises a connection part and an elastic sheet part, the connection part is connected to the plug body, the elastic sheet part is connected to the connection part, and the elastic sheet part is provided with a V-shaped slope structure that is in lock-catch fit with an RJ45 socket.

As a further improvement of the present utility model, the V-shaped slope structure protrudes from bottom to top.

As a further improvement of the present utility model, the V-shaped slope structure comprises a first inclined plane and a second inclined plane, and when the RJ45 plug is inserted into the RJ45 socket, the second inclined plane abuts against a locking block of the RJ45 socket.

As a further improvement of the present utility model, the second inclined plane abuts against a corner of the locking block of the RJ45 socket.

As a further improvement of the present utility model, the V-shaped slope structure is located at a tail end of the elastic sheet part.

As a further improvement of the present utility model, the second inclined plane is an end face of the tail end of the elastic sheet part.

As a further improvement of the present utility model, the elastic sheet part is arranged obliquely relative to a horizontal plane.

As a further improvement of the present utility model, the elastic sheet part is arranged along an insertion direction of the RJ45 plug, and a top ridge line of the V-shaped slope structure is perpendicular to the insertion direction of the RJ45 plug.

As a further improvement of the present utility model, the V-shaped slope structure and the elastic sheet part are arranged in the same width.

The present utility model has the following beneficial effects: the insertion tongue structure of the RJ45 plug is improved by the above solutions, the RJ45 plug can be directly pulled out and unlocked without pressing after being inserted into an RJ45 socket, and the improved insertion tongue structure does not need to provide a part for pressing, so that a length of the insertion tongue structure can be shortened, and the risk of breakage is reduced.

BRIEF DESCRIPTION OF THE DRAWINGS

In order to more clearly illustrate the technical solutions in the embodiments of the present utility model, the drawings required to be used in the description of the embodiments are briefly introduced below. It is obvious that the drawings in the description below are only some embodiments of the present utility model, and those of ordinary skill in the art can obtain other solutions according to these drawings without creative efforts.

DETAILED DESCRIPTION OF THE EMBODIMENTS

It should be noted that the embodiments and features in the embodiments of the present utility model can be combined with each other without conflict.

In the description of the present utility model, it should be understood that orientation or location relationships indicated by terms “central”, “transverse”, “longitudinal”, “upper”, “lower”, “front”, “rear”, “left”, “right”, “vertical”, “horizontal”, “top”, “bottom”, “inner”, “outer” and the like are orientation or location relationships based on the accompanying drawings, and are merely intended for ease of describing the present utility model and simplifying description, rather than indicating or implying that a specified apparatus or element needs to have a specific orientation or needs to be constructed and operated in a specific orientation. Therefore, such terms cannot be construed as a limitation on the scope of the present utility model. In addition, the terms “first”, “second”, and the like are merely intended for a purpose of description, and shall not be understood as an indication or implication of relative importance or implicit indication of a quantity of indicated technical features. Therefore, a feature limited by “first”, “second”, or the like may explicitly or implicitly include one or more features. In the descriptions of the present utility model, unless otherwise specified, “a plurality of” means two or more.

In descriptions of the present utility model, it should be noted that unless otherwise expressly specified and limited, terms “mount”, “interconnect”, and “connect” should be understood in a broad sense. For example, such terms may indicate a fixed connection, a detachable connection, or an integral connection; and may indicate direct interconnection, indirect interconnection through an intermediate medium, or internal communication between two elements. Those of ordinary skill in the art may understand specific meanings of the foregoing terms in the present utility model according to a specific condition.

The present utility model is further illustrated below with reference to the accompanying drawing and specific embodiments.

Figure 1:
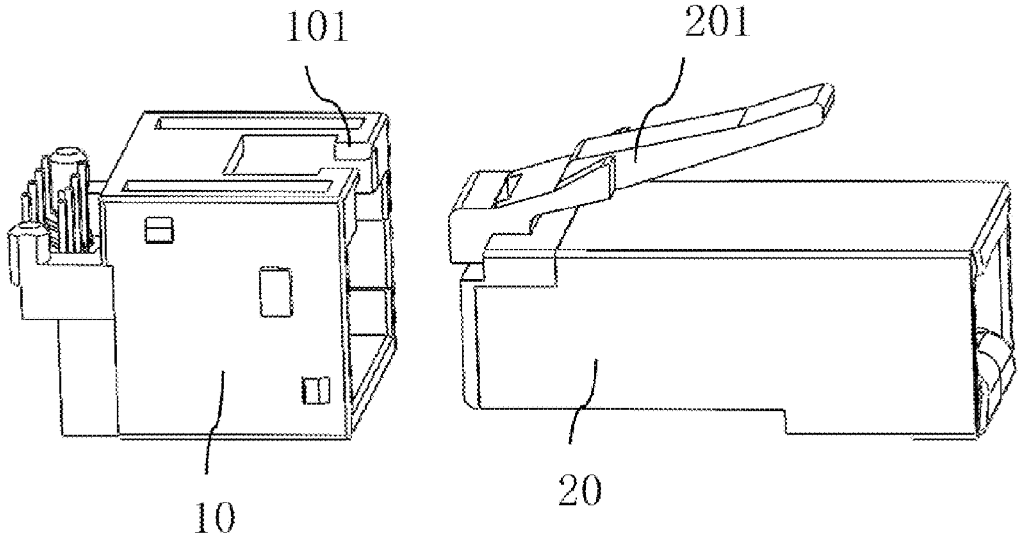
FIG. 1 (prior art)
FIG. 1 is a schematic diagram of an RJ45 plug in the prior art.
Figure 2:
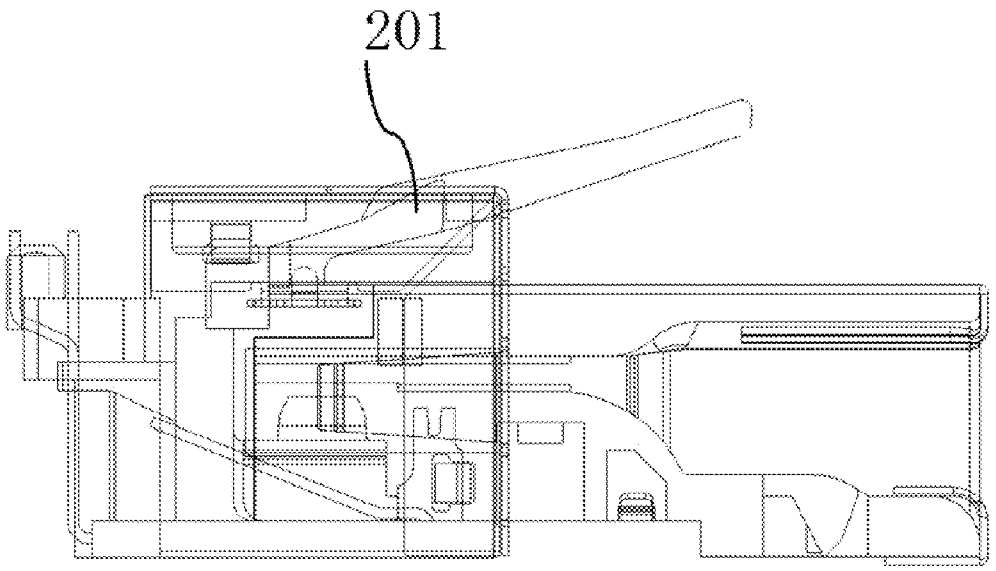
FIG. 2 (prior art)
FIG. 2 is a schematic diagram of assembly of an RJ45 plug in the prior art.
Figure 3:
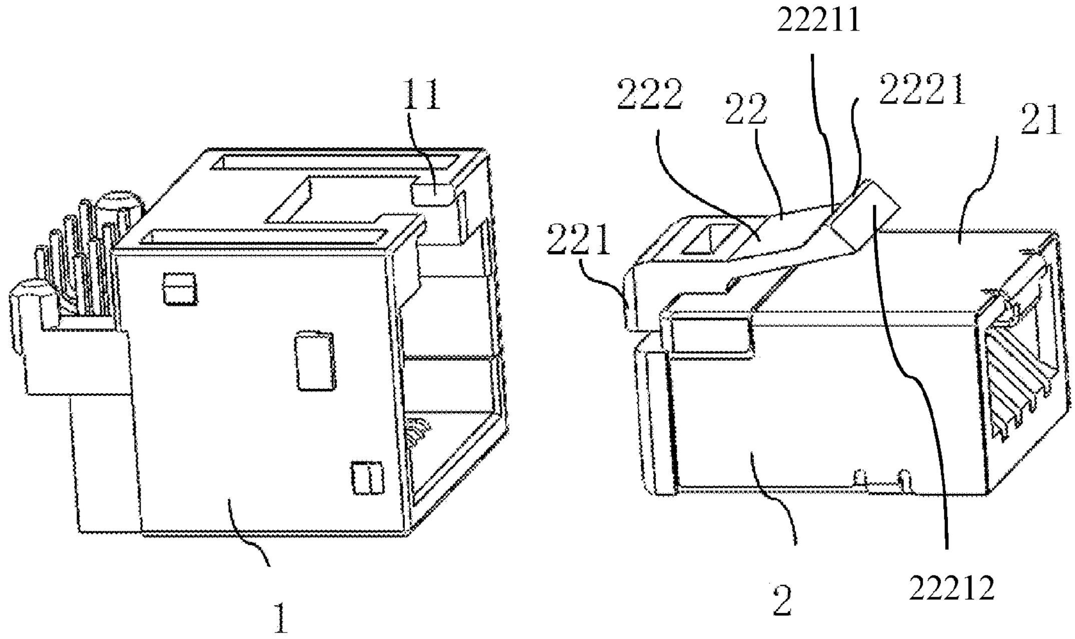
FIG. 3 is a schematic diagram of an RJ45 plug according to the present utility model.

As shown in FIG. 3, an RJ45 plug 2 comprises a plug body 21 and an insertion tongue structure 22 arranged on the plug body 21, wherein the insertion tongue structure 22 comprises a connection part 221 and an elastic sheet part 222, the connection part 221 is connected to the plug body 21, the elastic sheet part 222 is connected to the connection part 221, and the elastic sheet part 222 is provided with a V-shaped slope structure 2221 that is in lock-catch fit with a lock catch structure 11 of an RJ45 socket 1.

The V-shaped slope structure 2221 protrudes from bottom to top.

The V-shaped slope structure 2221 comprises a first inclined plane 22211 and a second inclined plane 22212, and when the RJ45 plug 2 is inserted into the RJ45 socket 1, the second inclined plane 22212 abuts against a locking block of the lock catch structure 11 of the RJ45 socket 1.

The second inclined plane 22212 abuts against a corner of the locking block of the RJ45 socket 1, especially a right-angled corner.

The V-shaped slope structure 2221 is located at a tail end of the elastic sheet part 222. The second inclined plane 22212 is an end face of the tail end of the elastic sheet part 222.

The elastic sheet part 222 is arranged obliquely relative to a horizontal plane.

The elastic sheet part 222 is arranged along an insertion direction of the RJ45 plug 2, and a top ridge line of the V-shaped slope structure 2221 is perpendicular to the insertion direction of the RJ45 plug 2.

The V-shaped slope structure 2221 and the elastic sheet part 222 are arranged in the same width, that is, the V-shaped slope structure and the elastic sheet part have the same width.

The present utility model provides an RJ45 plug 2, which has following advantages:

- firstly, when the RJ45 plug is inserted into the RJ45 socket, the plug can be directly pulled out and unlocked without pressing, so that the operation is convenient, and the plug is suitable for use in a narrow space;
- secondly, the improved insertion tongue structure does not need to provide a part for pressing, so that a length of the insertion tongue structure can be shortened, and the risk of breakage is reduced; and
- thirdly, the improved insertion tongue structure can adapt to a conventional RJ45 socket, so that the modification cost is reduced, and the compatibility is high.

The foregoing is a more detailed description of the present utility model in combination with specific preferred embodiments, and it cannot be considered that the specific implementation of the present utility model is only limited to these descriptions. For those of ordinary skill in the technical field to which the present utility model belongs, on the premise of not departing from the concept of the present utility model, some simple deductions or replacements can also be made, which should be regarded as falling within the protection scope of the present utility model.

The invention claimed is:

1. An RJ45 plug for mating with an RJ45 socket, comprising:

a plug body and an insertion tongue structure arranged on the plug body, wherein the insertion tongue structure comprises a connection part and an elastic sheet part, the connection part is connected to an insertion end of the plug body, the connection part comprises a vertical portion and a horizontal portion, a head end of the elastic sheet part is connected to an end of the horizontal portion of the connection part, a tail end of the elastic sheet part is provided with a V-shaped slope structure that is in lock-catch fit with the RJ45 socket, the V-shaped slope structure protrudes from bottom to top, the V-shaped slope structure comprises a first inclined plane and a second inclined plane, and when the RJ45 plug is inserted into the RJ45 socket, the second inclined plane abuts against a locking block of the RJ45 socket;

wherein the elastic sheet part extends along an opposite direction to an insertion direction of the RJ45 plug to successively form the first inclined plane and the second inclined plane;

wherein a bottom surface of the elastic sheet part is a flat surface, the bottom surface is arranged obliquely relative to a horizontal plane; a thickness of the head end of the elastic sheet part is smaller than a thickness of the horizontal portion; a cross section of the V-shaped slope structure is substantially triangular.

2. The RJ45 plug according to claim 1, wherein the second inclined plane abuts against a corner of the locking block of the RJ45 socket.

3. The RJ45 plug according to claim 1, wherein the second inclined plane is an end face of the tail end of the elastic sheet part.

4. The RJ45 plug according to claim 1, wherein a top ridge line of the V-shaped slope structure is perpendicular to the insertion direction of the RJ45 plug.

5. The RJ45 plug according to claim 1, wherein the V-shaped slope structure and the elastic sheet part are arranged in a same width.

6. The RJ45 plug according to claim 1, wherein a top surface of the elastic sheet part is flush with a top surface of the horizontal portion, a concave fillet is formed between the end of the horizontal portion and the bottom surface the elastic sheet part.

* * * * *